US008799171B2

(12) United States Patent
Baentsch et al.

(10) Patent No.: US 8,799,171 B2
(45) Date of Patent: Aug. 5, 2014

(54) SECURE ONLINE BANKING TRANSACTION APPARATUS AND METHOD

(75) Inventors: Michael Baentsch, Gross (CH); Peter Buhler, Horgen (CH); Thomas Eirich, Waedenswil (CH); Frank Hoering, Zurich (CH); Thorsten Kramp, Kilchberg (CH); Thomas Weigold, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 12/060,415

(22) Filed: Apr. 1, 2008

(65) Prior Publication Data
US 2009/0248580 A1  Oct. 1, 2009

(51) Int. Cl.
*G06Q 20/00* (2012.01)
(52) U.S. Cl.
USPC ............ 705/64; 705/16; 705/17; 705/18; 705/19; 705/20; 705/21; 705/22; 705/23; 705/24; 705/25; 235/379; 379/91.01; 379/91.02; 902/2
(58) Field of Classification Search
USPC ................................... 705/59, 64, 55
See application file for complete search history.

(56) References Cited

U.S. PATENT DOCUMENTS 5,962,838 A * 10/1999 Tamburrini ............ 235/462.45
7,637,421 B1 * 12/2009 Trocme ..................... 235/379
2006/0029296 A1 * 2/2006 King et al. ................. 382/313
2008/0067240 A1 * 3/2008 Nakano et al. ............. 235/380
2010/0214672 A1 * 8/2010 Yumiki et al. ............. 359/701

FOREIGN PATENT DOCUMENTS

GB    2406925 A  *  4/2005
GB    2424807 A1   10/2006
WO    WO98/07255 A1  2/1998
WO    WO03/102785 A1  12/2003

OTHER PUBLICATIONS

White, Ron, "How Computers Work", Millennium Ed., Que Corporation, Indianapolis, IN, 1999.*
International Search Report; CH920070105; Application No. PCT/IB2009/051357; Dated Mar. 31, 2009.

* cited by examiner

*Primary Examiner* — James A Reagan
(74) *Attorney, Agent, or Firm* — Cantor Colburn LLP; Daniel Morris

(57) ABSTRACT

A secure online banking transaction apparatus to communicate with a server over a non-secure connection is provided and includes a selector configured to allow for a selection of a mode of the apparatus, a processing unit coupled to the selector and including a secure communication unit, which is configured to set up a secure connection, along which a secure transaction occurs, with the server via the non-secure connection in accordance with the mode, an input unit coupled to the processing unit and configured to allow for a input of data into the apparatus, which is at least partly related to the secure transaction, and an interface coupled to the processing unit and configured to convey at least a status of the secure transaction and the contents off the inputted data.

17 Claims, 2 Drawing Sheets

SECURE ONLINE BANKING TRANSACTION APPARATUS AND METHOD

BACKGROUND OF THE INVENTION

Figure 1:
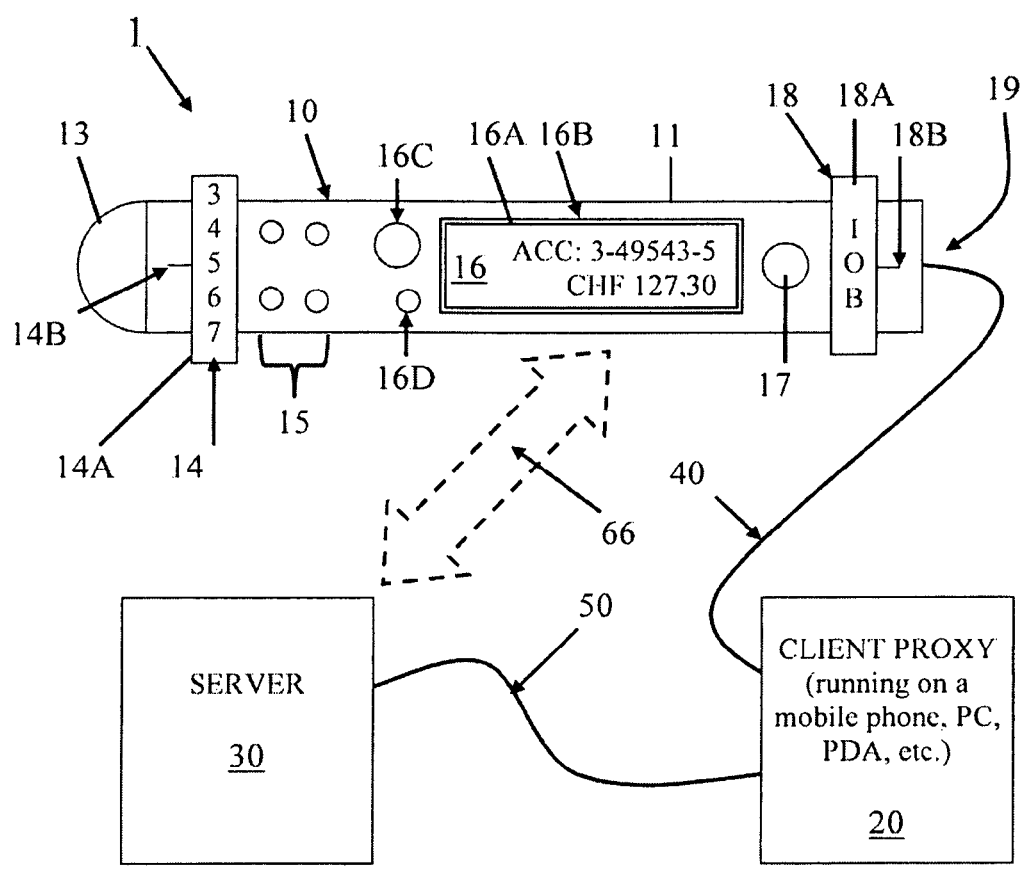

Aspects of the present invention are directed to transaction security and, more particularly, to a secure online banking transaction apparatus.

DESCRIPTION OF THE BACKGROUND

Modern online banking security requires that banks are always one step ahead of the latest real-world attacks. Of these, three types of attacks have to be considered, namely phishing attacks, malicious software attacks, and man-in-the-middle (MITM) attacks. Phishing is an attempt to criminally and fraudulently acquire sensitive information, such as usernames, passwords and credit card details, by masquerading as a trustworthy entity in an electronic communication. A malicious software attack involves the use of software designed to infiltrate or damage a computer system, such as a banking customer's computer, without the owner's informed consent. An MITM attack is an attack in which an attacker is able to read, insert and modify at will messages between two parties without either party knowing that the link between them has been compromised.

Any online banking solution, therefore, should protect itself against these attacks in such a way as to insure that user credentials cannot be accidentally revealed by a user, that user credentials are protected from unauthorized access, and that both client and server verify each other's respective identity without user intervention.

It is commonly accepted, however, that a standard client personal computer (PC) is considered to be inherently insecure and potentially infested by all kinds of malicious software, such as that which is used in malicious software attacks. This holds true for mobile devices, such as mobile phones or PDAs, which are increasingly turning into general computing devices.

SUMMARY OF THE INVENTION

In accordance with an aspect of the invention, a secure online banking transaction apparatus to communicate with a server over a non-secure connection is provided and includes a selector configured to allow for a selection of a mode of the apparatus, a processing, unit coupled to the selector and including a secure communication unit, which is configured to set up a secure connection, along which a secure transaction occurs, with the server via the non-secure connection in accordance with the mode, an input unit coupled to the processing unit and configured to allow for a input of data into the apparatus, which is at least partly related to the secure transaction, and an interface coupled to the processing unit and configured to convey at least a status of the secure transaction and the contents of the inputted data.

In accordance with another aspect of the invention, a system upon which a secure online banking transaction may be conducted is provided and includes a server on which the banking transaction occurs, a proxy client configured to connect to the server via a non-secure connection, and an apparatus coupled to the proxy client and including a selector configured to allow for a selection of a mode of the apparatus, a processing unit coupled to the selector and including a secure communication unit, which is configured to set up a secure connection, along which a secure transaction occurs, with the server via the non-secure connection in accordance with the mode, an input unit coupled to the processing unit and configured to allow for a input of data into the apparatus, which is at least partly related to the secure transaction, and an interface coupled to the processing unit and configured to convey at least a status of the secure transaction and the contents of the inputted data.

In accordance with yet another aspect of the invention, a method of conducting a secure online banking transaction with an apparatus is provided and includes establishing a non-secure connection between a proxy client and a server, selectively gathering data through the apparatus while in an offline state, coupling the apparatus to the proxy client, establishing a secure connection between the apparatus and the server via the non-secure connection between the proxy client and the server, and transmitting information, which at least partly includes the gathered data, via the secure connection between the apparatus and the server.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTIONS OF THE DRAWINGS

Figure 2:
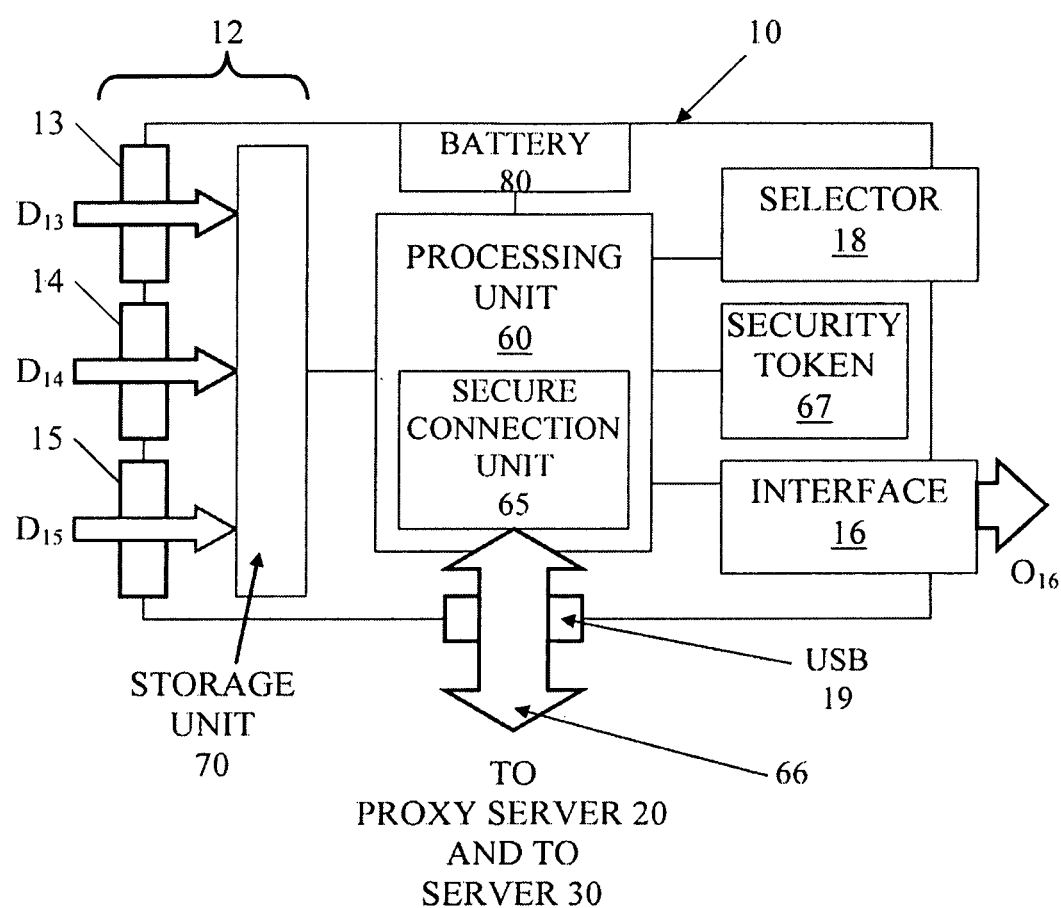

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is a schematic illustration of at system upon which a secure online banking transaction may be conducted in accordance with an exemplary embodiment of the invention; and FIG. 2 is a schematic diagram of a secure online banking transaction apparatus in accordance with an embodiment of the invention.

DETAILED DESCRIPTION OF THE INVENTION

With reference to FIGS. 1 and 2, a system 1 in accordance with an embodiment of the present invention is provided upon which a secure online banking transaction may be conducted. As shown, the system 1 includes a server 30 on which the banking transaction occurs, a proxy client 20, which is configured to connect to the server 30) via a non-secure connection 50, and an apparatus 10, which is coupled (see reference numeral 40 of FIG. 1) to the proxy client 20 and which allows a user to conduct secure banking transactions with the server 30.

Here, the server 30 may be any computing instrument or environment. In particular, the server 30 may be a banking server or some other similar computing device having bank software installed thereon for use in online banking transactions. Similarly, the proxy client 20 may be a mobile phone, a personal computer (PC), a personal digital assistant (PDA) or some other similar computing device. In any case, the proxy client 20 connects to the server 30 via the non-secure connection 50 over a local area network (LAN), a wide area network (WAN) or over some other suitable Internet connection.

The apparatus 10 includes a selector 18, which is configured to allow for a selection of a mode of the apparatus 10, and a processing unit 60. The processing unit 60 is coupled to the selector 18 and includes a secure connection unit 65. The secure connection unit 65 is configured to set up a secure connection 66, along which a secure banking transaction may occur, with the server 30 via the non-secure connection 50 in accordance with the selected mode of the apparatus 10. The apparatus 10 further includes an input unit 12, which is coupled to the processing unit 60 and which is configured to allow for an input of data into the apparatus 10, where the data is at least partly related to the secure banking transaction. In addition, the apparatus 10 includes an interface 16, which is coupled to the processing unit 60 and which is configured to convey at least a status of the secure banking transaction and the contents of the inputted data.

In greater detail, the processing unit 60 may be configured to download data from the proxy client 20 and/or the server 30. The data may include proxy software and/or software related to the server 30 that allows the apparatus 10, the proxy client 20 and the server 30 to immediately communicate with one another when the apparatus 10 and the proxy client 20 are coupled to one another. The data may also include remote configuration software and software updates as they become available. In addition, the data may include transaction histories of a user of the apparatus 10, current account balances of the user and other similar types of user information.

The connection 40 between the apparatus 10 and the proxy client 20 may be either a wired or a wireless connection in which the apparatus 10 uses the wireless connection via, e.g., Bluetooth. In any case, the apparatus 10 may further include a universal serial bus (USB) port 19 through which the connections are enabled. Where the apparatus 10 connects to the proxy client 20 wirelessly, the apparatus 10 may derive power from an on-board battery 80 and/or the connection 40 with the proxy client 20.

In accordance with embodiments of the invention, the apparatus 10 should be limited in size as much as possible so as to have a dimensional scale that is similar to that of a PDA stylus or a pen. To that end, the apparatus 10 may include a body 11 having a substantially cylindrical shape with a relatively narrow longitudinal axis. With this construction, the selector 18 may include a selector ring 18A disposed around the body 11. Here, the selector ring 18A is configured to rotate around the body 11 and to thereby occupy positions relative to a marker 18B where each of the positions are indicative of the selected mode of the apparatus 10.

In detail, the positions of the selector ring 18A may be indicative of an off position O, a secure connection position 1, and an offline data gathering position B. The secure connection position 1 is indicative of a secure connection mode in which the secure connection 66 is established with the server 30 while the offline data gathering position B is indicative of an offline data gathering mode in which data can be inputted into the apparatus 10 without the secure connection 66 being activated. In this mode, a large quantity of data can be inputted into the apparatus 10 for a later conducted transaction. Here, both the secure connection position 1 and the offline data gathering position B are representative of an on-state of the apparatus 10 in which the indicator light 17 (e.g., a red and/or green LED) is turned on.

According to embodiments of the invention, the input unit 12 includes a storage unit 70, which is configured to store inputted data for use by the processing unit 60, a scanning unit 13, which is configured to scan external information $D_{13}$, an alpha-numeric data input unit 14, by which alpha-numeric information $D_{14}$ is entered, and a keypad 15, including a set of function keys that issue commands $D_{15}$, to control a set of functions of the apparatus 10.

The scanning unit 13 may be disposed at an end of the body 11 of the apparatus 10 and may include an optical scanner. The optical scanner may be an infrared scanner, a 1D/2D bar code scanner, an optical character recognition (OCR) scanner or any other similar scanning device. In particular, the optical scanner should be able to scan external and/or printed information, e.g., a bar code of a bank check, so that the information contained in the bar code can be stored in the storage unit 70 and/or transferred to the server 30.

As with the embodiment of the selector 18 described above, the alpha-numeric data input unit 14 includes an alpha-numeric ring 14A disposed around the body 11. The alpha-numeric ring 14A is configured to rotate around the body 11 and to thereby occupy positions relative to a marker 14B that are each indicative of a manually inputted alpha-numeric character (e.g., 0, 1, 2, . . . , 9, *, #). As an additional matter, the various features described above may have additional functions beyond what has been described. For example, in certain situations, the alpha-numeric ring 14A may be employed to scroll through a menu displayed in the display 16A (which will be discussed below).

The keypad 15 includes a plurality of operable buttons. These may include an "OK" button that accepts an input and/or issues a command, a "KO" button that cancels a command, a "MENU." button that activates navigable menus of the apparatus 10 and a "SCAN" button that activates the scanning unit 13.

The interface 16 may include a display 16A on which an image is visibly displayed as output $O_{16}$. Here, the display 16A may be formed of a liquid crystal display (LCD) and may be large enough to display one or more lines of alpha-numeric information. Where the size of the display 16A is particularly limited by the overall size of the apparatus 10, the displayed image may be magnified by a magnifying lens 16B that can be attached to the apparatus 10 so as to lie over the display 16A.

According to other embodiments of the invention, the interface 16 may further include a loudspeaker 16C which is configured to audibly convey information by itself or along with the display 16A. In addition, an earphone jack 16D may be provided on the apparatus 10 to which earphones are coupled such that the information is only audibly conveyed through the earphones.

Although described above as being substantially cylindrical, the body 11 may have any suitable shape and dimensions. Moreover, given the shape and the dimensions of the body 11, each of the scanning unit 13, the alpha-numeric data input unit 14, the scanner 16 and the selector 18 are then constructed accordingly.

In order to manage a control of the processing unit 60, software may be installed in the processing unit 60. Such software may be configured to mediate the set up of the secure connection 66 and to maintain a predetermined security level thereof. The maintenance of the predetermined security level may include the use of a security token 67 for crypto operations to be attached to the apparatus 10. Here, the security token 67 enables secure processing and is configured to encrypt a portion of information transmitted along the secure connection 66. In addition, an identification system may be employed which is configured to prevent unauthorized use of the apparatus 10. The identification system may include the use of a personal identification number (PIN), such as the number 127,30 shown in display 16A of FIG. 1, that must be inputted to the apparatus 10 correctly by the user in order to "open" the apparatus 10 or, if present, the security token 67. In accordance with embodiments of the invention, a potential user has a limited number, typically three (3), chances to input a correct PIN into the apparatus before he/she is locked out by software stored in the processing unit 60 and/or the security token 67.

In accordance with another aspect of the invention, a method of conducting a secure online banking transaction with an apparatus 10 is provided and includes establishing a non-secure connection 50 between a proxy client 20 and a server 30, selectively gathering data through the apparatus 10 in an offline state, coupling the apparatus 10 to the proxy client 20, establishing a secure connection 66 between the apparatus and the server 30 via the non-secure connection 50 between the proxy client 20 and the server 30, and transmitting information. Here, the transmitting of the information at least partly includes a transmission of the gathered data via the secure connection 66 between the apparatus 10 and the server 30.

In accordance with the embodiments described above, a transaction using the apparatus 10 may proceed according to the following description. First a user turns the apparatus on by manipulating the selector to the I or the B position and is prompted to enter her PIN. Using the alpha-numeric ring 14A, the user enters her PIN digit by digit and accepts each digit by pressing the OK button. The user then scans transaction information from, for example, a payment order by pressing the SCAN button to start the scanning and the OK button to finish the scanning.

At this point, the apparatus either applies an OCR operation or processes a 2D barcode printed on the payment order and displays the crucial transaction information to the user. The user then accepts the transaction data by pressing the OK button and is given a list of her accounts to choose from. This list may be navigable for the user by rotating the alpha-numeric ring 14A and again pressing the OK button to select one account.

From here once the user manipulates the selector to the I position (if it is not already it that position), the apparatus 10 establishes a secure connection 66 to the server 30 via the connection 40 between the apparatus 10 and the proxy client 20 and the non-secure connection 50 between the proxy client 20 and the server 30. Once the transaction has been performed, the apparatus 10 displays a confirmation message to the user.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A secure online banking transaction apparatus that communicates with a server over a non-secure connection, the apparatus comprising:
   a body having a cylindrical shape;
   a mode selection ring disposed around a first end of the cylindrically shaped body in a circumferential dimension to be selectively rotated around the body in the circumferential dimension to thereby occupy positions indicative of a selected mode;
   a hardware processing unit coupled to the mode selection ring and including a secure communication unit to set up a secure connection along which a secure transaction occurs with the server via the non-secure connection in accordance with the selected mode;
   an input unit coupled to the hardware processing unit allowing for input of data relating to the secure transaction, the input unit comprising an alpha-numeric data input ring and a keypad adjacent to one another, the alpha-numeric data input ring being disposed around a second end of the cylindrically shaped body, which is opposite the first end, to be selectively rotated around the body in the circumferential dimension to thereby occupy positions indicative of an inputted alpha-numeric character; and
   an interface coupled to the hardware processing unit conveying secure transaction status and contents of the inputted data.

2. The apparatus according to claim 1, wherein the non-secure connection is set up between a proxy client, to which the apparatus is connected, and the server.

3. The apparatus according to claim 2, wherein the hardware processing unit downloads data from the proxy client or the server.

4. The apparatus according to claim 2, wherein the connection between the apparatus and the proxy client is either wired or wireless.

5. The apparatus according to claim 2, wherein the apparatus derives power from an on-board battery or the connection with the proxy client.

6. The apparatus according to claim 1, wherein the positions indicative of the selected mode comprise:
   an off position;
   a secure connection position; and
   an offline data gathering position.

7. The apparatus according to claim 1, wherein the input unit comprises:
   a storage unit to store the inputted data; and
   a scanning unit to scan external information to be stored in the storage unit.

8. The apparatus according to claim 7, wherein the scanning unit is disposed at the second end of the body of the apparatus.

9. The apparatus according to claim 7, wherein the scanning unit comprises an optical scanner.

10. The apparatus according to claim 1, wherein the keypad comprises a plurality of operable buttons.

11. The apparatus according to claim 1, wherein the interface comprises a display on which an image is visibly displayed.

12. The apparatus according to claim 11, further comprising a magnifying lens to magnify the visibly displayed image.

13. The apparatus according to claim 1, wherein the interface comprises a loudspeaker to audibly convey information.

14. The apparatus according to claim 13, further comprising an earphone jack to which earphones are coupled such that the information is only audibly conveyed through the earphones.

15. The apparatus according to claim 1, further comprising software, including a set of executable instructions installed in the hardware processing unit to mediate the set up of the secure connection and to maintain a predetermined security level.

16. The apparatus according to claim 15, wherein the maintenance of the predetermined security level comprises:
   a security token to facilitate secure data transmission between the apparatus and the server, the security token encrypting a portion of information transmitted along the secure connection; and
   an identification system to prevent unauthorized use of the apparatus.

17. A system to conduct a secure online banking transaction, the system comprising:
- a server on which the banking transaction occurs;
- a proxy client to connect to the server via a non-secure connection; and
- an apparatus coupled to the proxy client and including:
    - a body having a cylindrical shape,
    - a mode selection ring disposed around a first end of the cylindrically shaped body in a circumferential dimension to selectively rotate around the body in the circumferential dimension to thereby occupy positions indicative of a selected mode,
    - a hardware processing unit coupled to the mode selection ring and including a secure communication unit to set up a secure connection along which a secure transaction occurs with the server via the non-secure connection in accordance with the selected mode,
    - an input unit coupled to the hardware processing unit allowing for a input of data into the apparatus related to the secure transaction, the input unit comprising an alpha-numeric data input ring and a keypad adjacent to one another, the alpha-numeric data input ring being disposed around a second end of the cylindrically shaped body, which is opposite the first end, to be selectively rotated around the body in the circumferential dimension to thereby occupy positions indicative of an inputted alpha-numeric character, and
    - an interface coupled to the hardware processing unit conveying secure transaction status and contents of the inputted data.

\* \* \* \* \*